US007657766B2

(12) United States Patent
Gonzalez et al.

(10) Patent No.: US 7,657,766 B2
(45) Date of Patent: Feb. 2, 2010

(54) APPARATUS FOR AN ENERGY EFFICIENT CLUSTERED MICRO-ARCHITECTURE

(75) Inventors: Jose Gonzalez, Sant Adria de Besos (ES); Antonio Gonzalez, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 188 days.

(21) Appl. No.: 11/698,612

(22) Filed: Jan. 26, 2007

(65) Prior Publication Data

US 2007/0124616 A1 May 31, 2007

Related U.S. Application Data

(63) Continuation of application No. 10/673,955, filed on Sep. 29, 2003, now Pat. No. 7,194,643.

(51) Int. Cl.
*G06F 1/32* (2006.01)

(52) U.S. Cl. ............................. 713/320; 712/200

(58) Field of Classification Search ................ 712/220, 712/200; 713/320
See application file for complete search history.

(56) References Cited

U.S. PATENT DOCUMENTS

| | | | | | |
|---|---|---|---|---|---|
| 5,564,015 | A | * | 10/1996 | Bunnell | 714/47 |
| 5,913,068 | A | * | 6/1999 | Matoba | 713/322 |
| 6,065,122 | A | * | 5/2000 | Wunderlich et al. | 713/320 |
| 6,167,524 | A | * | 12/2000 | Goodnow et al. | 713/300 |
| 6,711,691 | B1 | * | 3/2004 | Howard et al. | 713/300 |
| 6,794,824 | B2 | | 9/2004 | Song et al. | |
| 6,804,632 | B2 | * | 10/2004 | Orenstien et al. | 702/188 |
| 7,035,240 | B1 | * | 4/2006 | Balakrishnan et al. | 370/338 |
| 7,437,438 | B2 | * | 10/2008 | Mogul et al. | 709/223 |
| 2002/0124196 | A1 | * | 9/2002 | Morrow et al. | 713/320 |
| 2004/0215987 | A1 | * | 10/2004 | Farkas et al. | 713/300 |
| 2005/0050373 | A1 | * | 3/2005 | Orenstien et al. | 713/320 |

OTHER PUBLICATIONS

"Evaluating Opportunity and Effectiveness of Cache Resizing to Reduce Energy Dissipation" Se-Hyun Yang, Michael D. Powell, Babak Falsafi, Kaushik Roy, and T. N. Vijaykumar, Jun. 2001.*

(Continued)

*Primary Examiner*—Eddie P Chan
*Assistant Examiner*—Idriss N Alrobaye
(74) *Attorney, Agent, or Firm*—Blakely, Sokoloff, Taylor & Zafman LLP

(57) ABSTRACT

In some embodiments, an apparatus for an energy efficient clustered micro-architecture are disclosed. In one embodiment, the micro-architecture computes an energy delay$^2$ product for each active instruction scheduler and one or more associated function blocks of a current architecture configuration over a predetermined period. Once the energy delay$^2$ product is computed, the computed product is compared against an energy delay$^2$ product calculated for a prior architecture configuration to determine an effectiveness (energy efficiency) of the current architecture configuration. Based on the effectiveness of the current architecture configuration, a number of active instruction schedulers and one or more associated functional blocks within the current architecture configuration is adjusted. In one embodiment, the number of active instruction schedulers and one or more associated functional blocks may be increased or decreased to improve power efficiency of the cluster micro-architecture. Other embodiments are described and claimed.

4 Claims, 14 Drawing Sheets

OTHER PUBLICATIONS

"Managing Mixed-Use Clusters with Cluster-on-Demand" by Justin Moore, David Irwin, Laura Grit, Sara Sprenkle, and Jeff Chase. Technical Report, Nov. 2002.*

"Dynamic Virtual Clusters in a Grid Site Manager" by Jeff Chase, Laura Grit, David Irwin, Justin Moore, and Sara Sprenkle. In the Twelfth International Symposium on High Performance Distributed Computing (HPDC-12), Jun. 2003.*

"Dynamic Cluster Resizing" Jose Gonzalez, Antonio Gonzalez, iccd,pp. 375, 2003 IEEE International Conference on Computer Design (ICCD'03), 2003.*

"Bosschere. Early design phase power/performance modeling through statistical simulation" by Lieven Eeckhout, Koen De Bosschere, Proc. 2001 IEEE Intl. Symp. on Performance Analysis of Systems and Software.*

Stan, Mircea R. et al., "Power-aware computing", IEEE Computer Society, Dec. 2003.

Mathew, Binu K., "The perception processor", Aug. 2004.

Hsu, Chun-Hsing, et al., "Towards efficient supercomputing: a quest for the right metric", IEEE Workshop on High-Performace, Power-Aware Computing, Apr. 2005.

* cited by examiner

APPARATUS FOR AN ENERGY EFFICIENT CLUSTERED MICRO-ARCHITECTURE

CROSS-REFERENCE TO RELATED APPLICATION

This application is a continuation of U.S. patent application Ser. No. 010/673,955, filed Sep. 29, 2003 now U.S. Pat. No. 7,194,643.

FIELD

One or more embodiments relate generally to the field of processor architecture design. More particularly, one or more of the embodiments relate to an apparatus for an energy efficient clustered micro-architecture.

BACKGROUND

Larger and wider instruction windows, combined with out-of-order execution, have facilitated the exploitation of instruction level parallelism (ILP) over the past decade. Super scalar architectures have evolved towards higher issue widths and longer instruction windows in order to achieve higher instruction throughput by taking advantage of the ever-increasing availability of on-chip transistors. These trends are likely to continue with next generation multi-threaded processors, which allow for much better utilization of the resources in a wide issue super-scalar core. However, increasing the window size (e.g., going from a four-way issue to an eight-way issue processor) is not a trivial issue; it involves a lot of design and verification challenges.

It is well-known that current super-scalar organizations are approaching a point of diminishing returns. It is not trivial to change from a four-way issue to an eight-way issue architecture due to hardware complexity and implications in the cycle time. Nevertheless, the ILP that an eight-way issue processor can exploit far exceeds that provided by a four-way issue processor. In addition, the impact of wire delays, the increasing complexity of processor components, as well as power dissipation, constitute three important barriers for scaling up current super-scalar micro-architectures. Furthermore, the increasing complexity of some critical components, such as issue logic, bypass, register file and renaming logic, may have a direct influence on clock cycle time.

One of the proposed solutions to this problems is a technique referred to as clustering. In a clustered micro-architecture, some of the critical components are partitioned into simpler structures to reduce the impact of wire delays as far as signals that are kept within the clusters. Clusters offer the advantages of partitioned schemes where one can achieve higher rates of ILP and sustain a high clock rate. The partitioned architecture tends to make hardware simpler and control and datapaths faster. For instance, a partitioned architecture has fewer register file parts, fewer data bus sources/destinations and fewer alternatives for many control decisions.

Accordingly, clustering provides an alternative to designing wide and deep super-scalar processors by replacing them with a collection of smaller windows and associated functional unit clusters. Each cluster issues next execute instructions that are directed to it. Values produced within a cluster become available to a consumer within the cluster faster than to a consumer in another cluster. For remote clusters, a delay, called the "inter-cluster bypass latency" (ICBL), is paid. This latency across clusters is present due to the age wire delays that exist across current chips.

The processor resources required for an effective execution of a given application vary across different applications, and they also vary across different sections of the same application. As a result, certain applications will not utilize all processor resources, while such processor resources continue to consume power. As a result, clustered micro-architectures may consume inordinate amounts of power, which render such micro-architectures infeasible within energy-sensitive devices, such as portable or hand-held devices, which rely on an on-board power supply for operation. Therefore, there remains a need to overcome one or more of the limitations in the above-described, existing art.

BRIEF DESCRIPTION OF THE DRAWINGS

The various embodiments are illustrated by way of example, and not by way of limitation, in the figures of the accompanying drawings and in which.

DETAILED DESCRIPTION

A method and apparatus for an energy efficient clustered micro-architecture is described. In one embodiment, the cluster micro-architecture computes an energy delay$^2$ product for each active instruction scheduler of a current architecture configuration over a predetermined period. Once the energy delay$^2$ product is computed, the computed product is compared against an energy delay$^2$ product calculated for a prior architecture configuration to determine an effectiveness (energy efficiency) of the current architecture configuration. Based on the effectiveness of the current architecture configuration, a number of active instruction schedulers within the current architecture configuration is adjusted. In one embodiment, the number of active instruction schedulers may be increased or decreased to improve power efficiency of the cluster micro-architecture.

Figure 1:
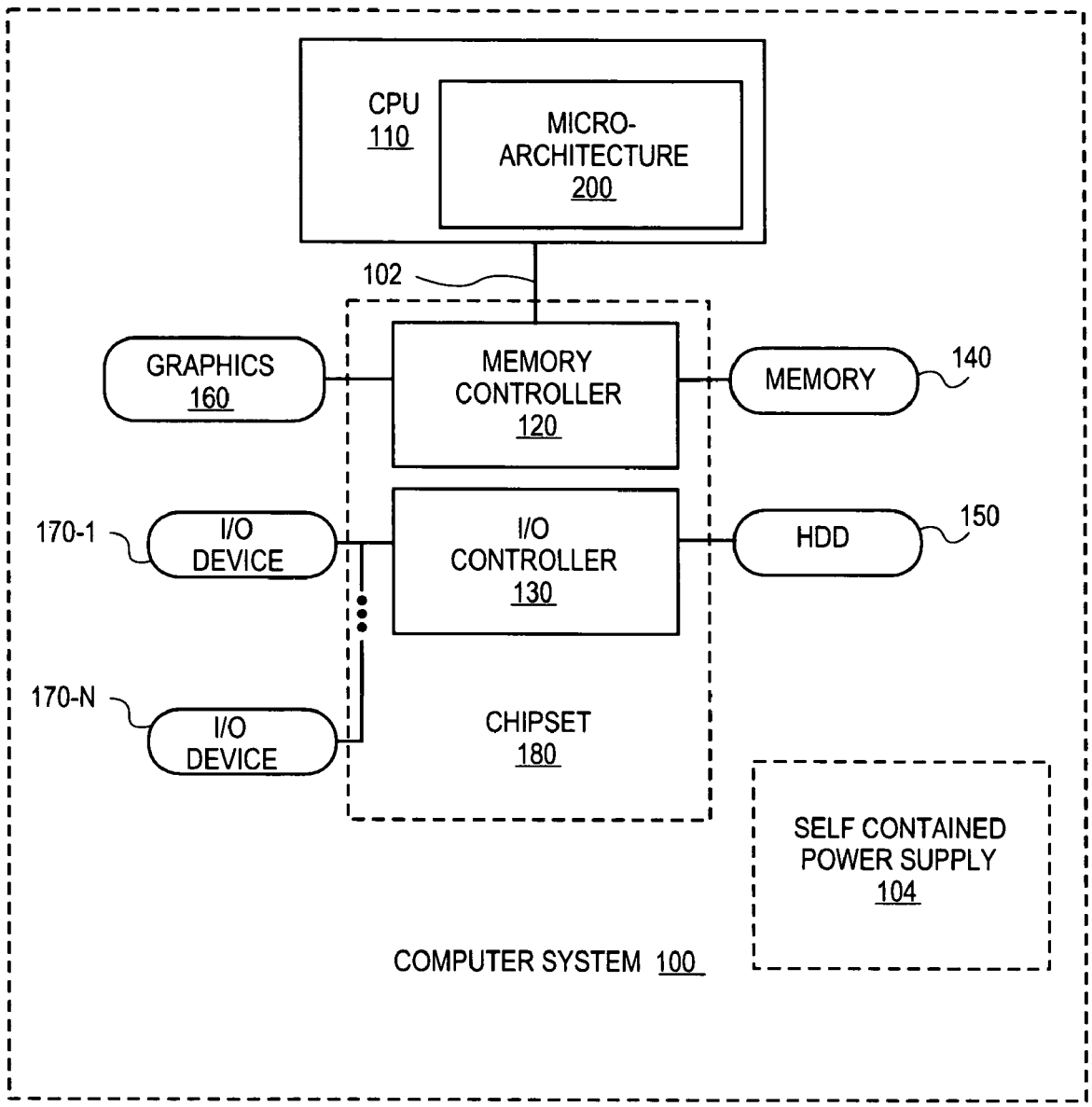
FIG. 1 is a block diagram illustrating a computer system, including an energy efficient clustered micro-architecture, in accordance with one embodiment.

FIG. 1 is a block diagram illustrating a computer system 100 including a processor 110 having micro-architecture 200, in accordance with one embodiment. In one embodiment, micro-architecture 200 is configured as an energy efficient clustered micro-architecture, in accordance with one embodiment. Computer system 100 comprises a processor system bus (front side bus (FSB)) 102 for communicating information between the processor (CPU) 110 and a chipset 180 coupled together via FSB 102.

As described herein, the term "chipset" is used in a manner well-known to those skilled in the art to describe collectively the various devices coupled to CPU 110 to perform desired system functionality. Chipset 180 is comprised of a memory controller or memory controller hub (MCH) 120, as well as an input/output (I/O) controller or I/O controller hub (ICH) 130. Memory controller 120 of chipset 180 is coupled to main memory 140 and one or more graphics devices or graphics controller 160.

In one embodiment, main memory 110 is volatile memory, including but not limited to, random access memory (RAM), synchronous RAM (SRAM), double data rate (DDR) S-dynamic RAM (SDRAM), rambus dynamic-RAM (RDRAM), or the like. In addition, hard disk drive devices (HDD) 150, as well as one or more I/O devices 170 (170-1, . . . , 170-N) are coupled to I/O controller 130 of chipset 180. As illustrated, CPU 110 includes micro-architecture 200 for power optimized replay of blocked uOPs, which is further illustrated with reference to FIG. 2.

It should be understood that embodiments described may be used in any apparatus having a processor. Although embodiments of system 100 are not limited in this respect, system 100 may be a portable device that includes a self contained power supply (source) 104, such as a battery. A non-exhaustive list of examples of such portable devices includes laptop and notebook computers, mobile telephones, personal digital assistants (PDAs), and the like. Alternatively, system 100 may be a non-portable device, such as, for example, a desktop computer or a server computer not including optional source 104.

Figure 2:
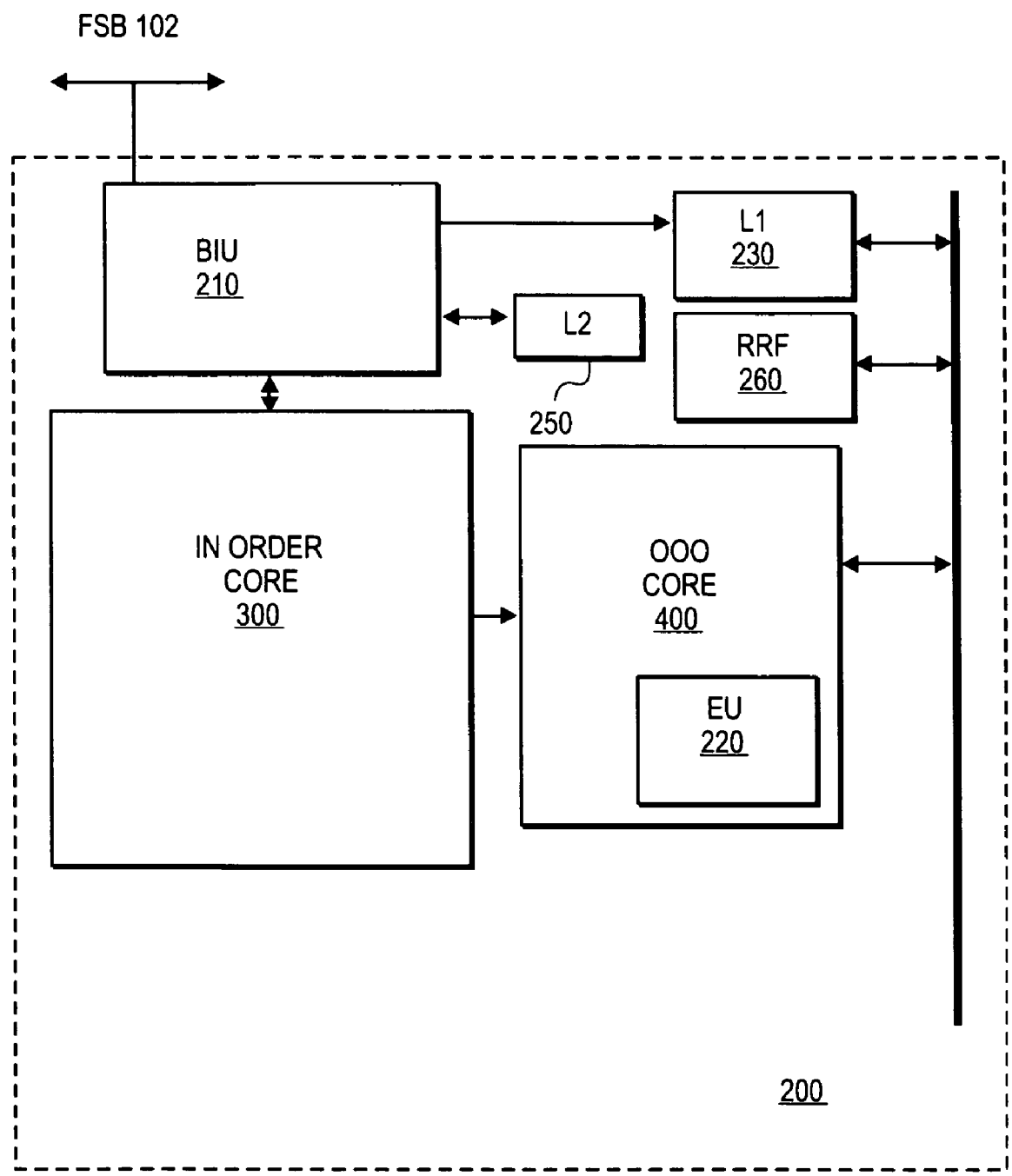
FIG. 2 is a block diagram further illustrating the clustered micro-architecture of FIG. 1, in accordance with one embodiment.

FIG. 2 illustrates micro-architecture 200 of CPU 110, which may be configured as an energy efficient clustered micro-architecture, in accordance with one embodiment. In the embodiment illustrated, micro-architecture 200 is configured to perform dynamic execution. As described herein, dynamic execution refers to the use of front-end logic 300 to fetch the next instructions according to program order and prepare the instructions for subsequent execution in the system pipeline. As illustrated, front-end logic 300 is comprised of an instruction-fetch unit 310 (FIG. 3) which fetches upcoming program instructions for execution and prepares the instructions for future use within the system pipeline.

In effect, front-end logic 300 supplies a high bandwidth stream of decoded macro-instructions, referred to herein as "micro-operations" (uOPs), to out-of-order (OOO) core 400, which directs the execution (the actual completion) of the uOPs. To execute instructions in the most efficient manner, front-end logic 300 may utilize highly accurate branch prediction logic (not shown) to speculate where a program will execute next to enable performance of dynamic execution. Once uOPs are received by OOO core 400, the uOPs are scheduled to avoid stalling when following delayed instructions. In other words, uOPs are executed in an out-of-order execution fashion when required to ensure the most efficient use of available processor resources.

Accordingly, front-end logic 300 may fetch macro-instructions from, for example, level 2 cache (L2) 250 via bus interface unit (BIU) 210. Once the instructions are fetched, the instructions are decoded into basic operations or uOPs. Accordingly, in-order core 300 provides a stream of decoded macro-instructions or uOPs to OOO core 400, which may schedule execution of the uOPs via execution units (EU) 230. In accordance with one embodiment, OOO core 400 may be configured as one or more clustered logic units, for example, as illustrated with reference to FIG. 3.

Figure 3:
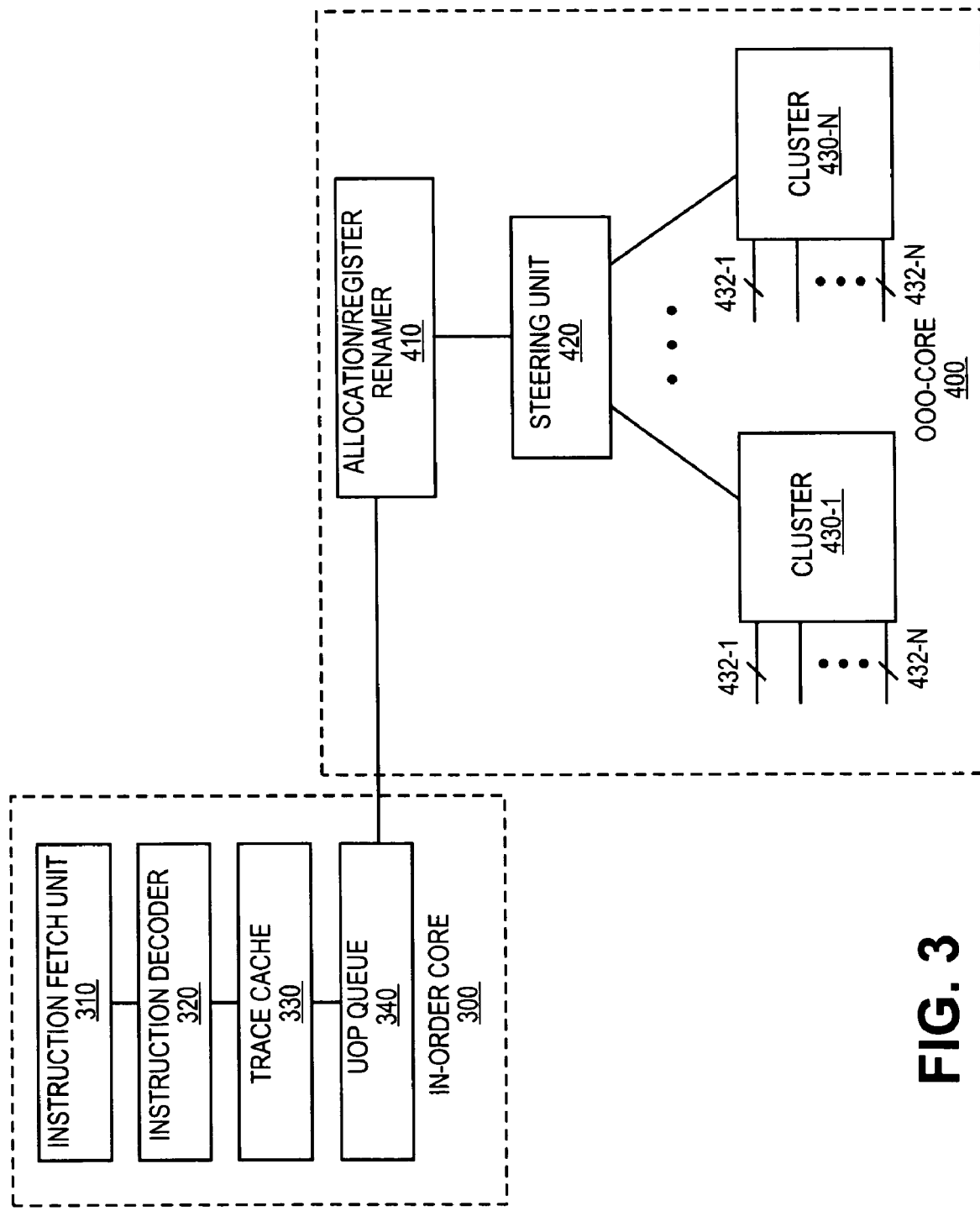
FIG. 3 is a block diagram further illustrating in-order core and out-of-order core of clustered micro-architecture of FIG. 2, in accordance with a further embodiment.

FIG. 3 illustrates micro-architecture 200 configured according to an energy efficient clustered micro-architecture configuration, in accordance with one embodiment. In-order core 300 is comprised of instruction fetch unit 310 to fetch macro-instructions from, for example, an L2 cache (not shown), which are provided to instruction decoder 320. Instruction decoder 320 decodes received macro-instructions into uOPs, which are provided to trace cache 330. Once decoded, uOPs may be placed within uOP queue 340 and provided as a high bandwidth stream to OOO core 400.

As illustrated, OOO core 400 is comprised of logic components for allocation, renaming and scheduling functions. Using the various logic, OOO core 400 reorders uOPs to allow them to execute as quickly as their input operands are ready. OOO core 400 includes several buffers to perform reordering, tracking and sequencing of operations (or uOPs), which are allocated via allocator logic 410. When resources become available, allocator 410 assigns the resources to requesting uOPs and allows the satisfied uOPs to flow down the pipeline for execution.

Register renamer logic 410 renames logical operands of received uOPs onto an N-entry physical register file. As a result, architecturally defined registers are expanded to physical registers available within micro-architecture 200. Once renaming of the logical operands of the uOPs to physical registers within a physical register file is completed, the uOPs are provided to steering unit 420 to dispatch uOPs to the proper cluster according to the steering policy. Steering unit 420 is configured to distribute received uOPs among the various clusters 430 (430-1, . . . , 430-N) to expedite scheduling and execution of the various uOPs.

In one embodiment, each cluster 430 may include one or more instruction schedulers (IS) 432 (432-1, . . . , 432-N). Instruction schedulers 432 receive and store uOPs assigned thereto from steering unit 420. Once all source operands of the uOP are available, instruction scheduler 432 issues the uOP for execution. In one embodiment, each cluster includes an instruction scheduler 432 for each uOP instruction type, including, for example, integer uOPs, floating point uOPs, memory uOPs, copy uOPs or the like.

By enabling each instruction scheduler of each cluster 430 as active, steering unit 420 may assign the various received uOPs to a cluster to enable scheduling and subsequent execution of the uOPs. However, processor resources required for an effective execution of an application vary across different sections of the application itself and across different applications as well. As such, depending on the stage of execution or application, energy is consumed by each active instruction scheduler of each cluster, although the scheduler is not necessarily processing uOPs. Conversely, execution delays may result when too few instructions schedulers 432 are active.

Accordingly, in one embodiment, clusters 430 are configured to enable or disable resources within clusters 430 that do not contribute to or improve performance. By enabling or disabling processor or cluster instruction schedulers, micro-architecture 200 may be configured as a power efficient clustered micro-architecture. In one embodiment, an amount of energy consumed by each instruction scheduler (IS) of a cluster is computed during a particular time interval. This estimation is used to compute the energy effectiveness of the current configuration and decide whether to decrease or increase the number of active IS (AIS). In one embodiment, the performance metric used to compute the energy effectiveness (efficiency) of a configuration is an estimated Energy Delay$^2$ Product (ED$^2$P) metric as an input to resizing schemes described below for increasing or decreasing a number of AIS. Furthermore, Energy Delay Product or simply Energy could be used as metrics to measure the effectiveness of an energy-aware architecture.

Figure 4:
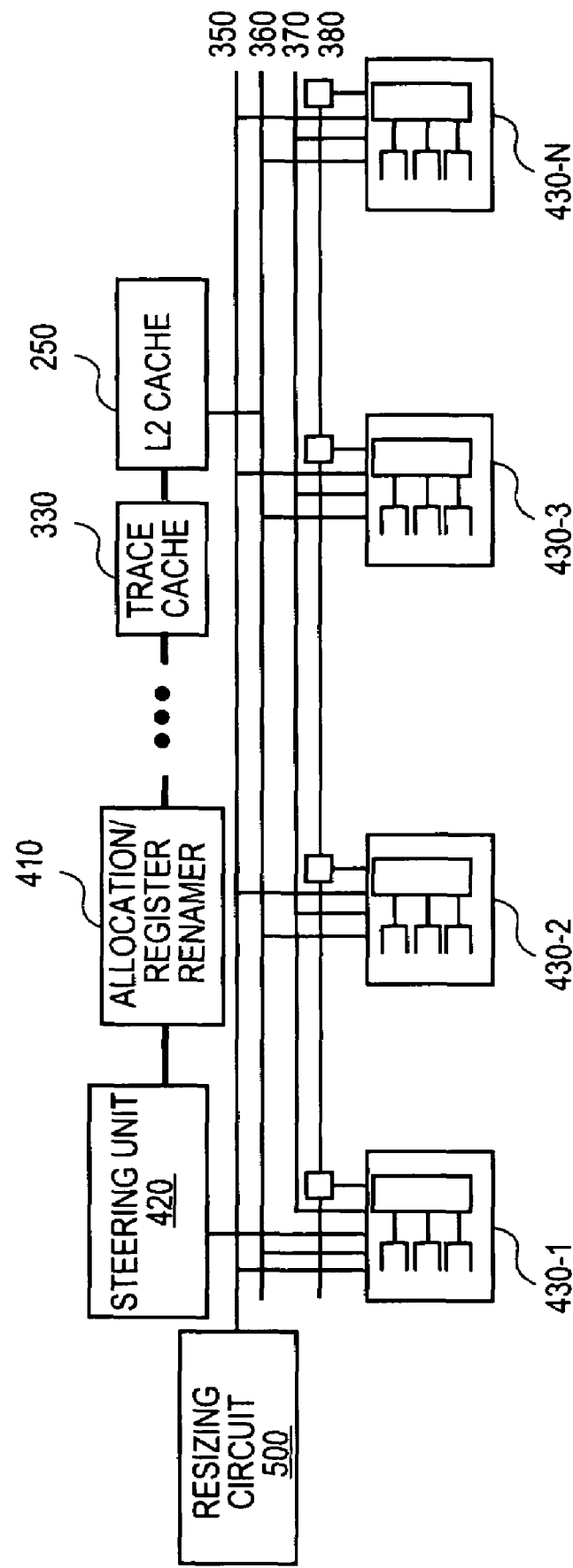
FIG. 4 is a block diagram illustrating a clustered component of the clustered micro-architecture of FIG. 3, in accordance with one embodiment.

FIG. 4 further illustrates clustered micro-architecture 200, in accordance with one embodiment. The various clusters are provided with four different types of global interconnections. In one embodiment, control buses 350 are provided to send instructions and control signals from in-order core 300 to the various clusters 430. A disambiguation bus 360 is also provided for broadcasting the effective address of store instructions. A memory bus 370 is provided for bringing data back to and from to L2 cache and for invalidations. Likewise, point-to-point links 380 are provided and used to communicate values among the different register files (not shown). In one embodiment, the steering unit 420 steers or issues uOPs according to a communications aware steering policy, which sends the instruction to the cluster that has most of the inputs, and in the case of a tie, to the least loaded cluster.

FIG. 4 also illustrates resizing circuit 500 coupled to a control bus 350. In one embodiment, resizing circuit 500 is configured to determine an energy efficiency of each cluster 430. In one embodiment, an energy effectiveness is determined for each IS type within micro-architecture 300. For example, resizing circuit 500 may determine a configuration effectiveness for the floating point (FP) IS (FPIS) type. According to a number of active FPIS, an energy performance metric, such as, for example, ED$^2$P product is calculated and compared to a previously-calculated ED$^2$P product. If a decrease in the computer product is identified, then a current configuration exhibits additional energy effectiveness. Conversely, if an increase in the computed product is detected, a current configuration has a reduced energy effectiveness. As such, based on the energy effectiveness, the number of active FPIS may be either increased or decreased, as described in further detail below.

Figure 5:
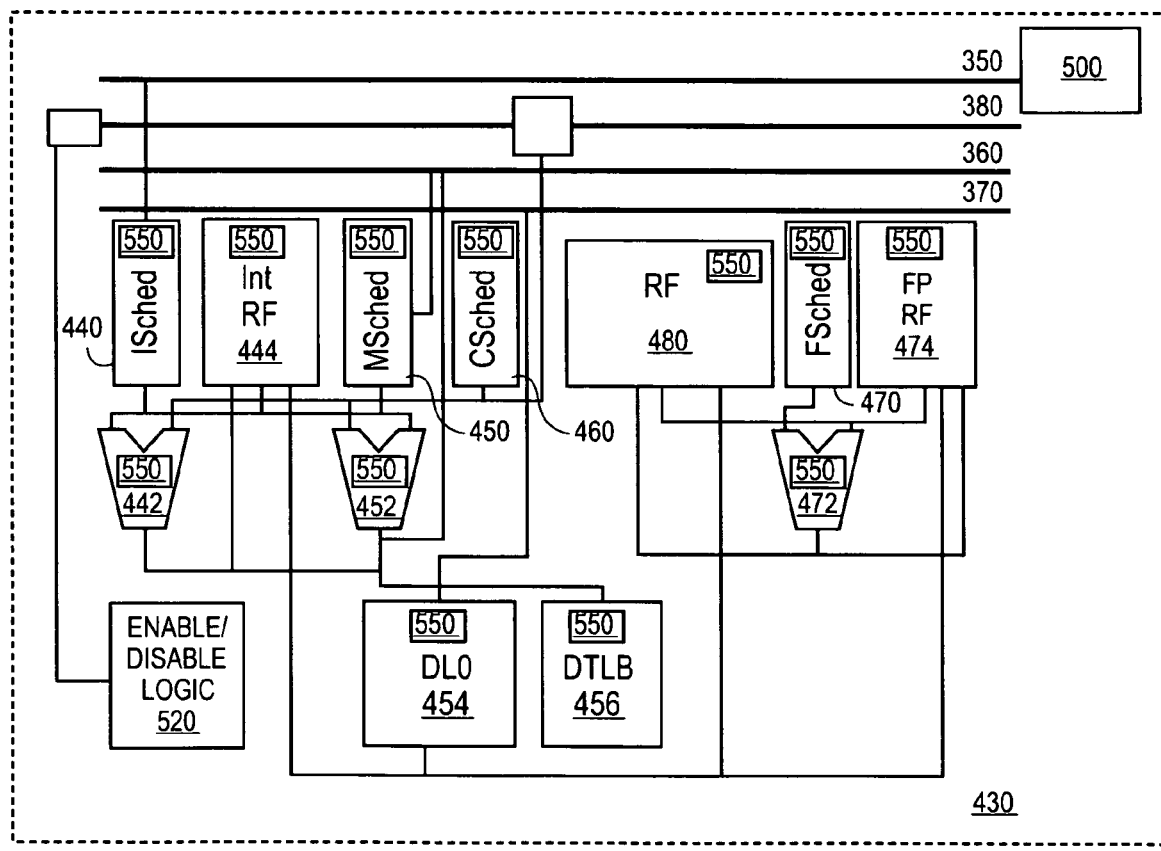
FIG. 5 is a block diagram illustrating a clustered component of the clustered micro-architecture of FIG. 3, in accordance with one embodiment.

As illustrated with reference to FIG. 5, in one embodiment, uOPs (instructions) enter one of integer instruction scheduler (ISched) 440, memory instruction scheduler (MSched) 450, copy instruction scheduler (CSched) 460 and floating point scheduler (FSched) 470 once steered by steering unit 420 (FIG. 3) and remain therein until all source operands are available. At that time, and according to availability of different resources (ports, functional units, etc.), instructions are issued for execution, leaving the corresponding scheduler.

In one embodiment, one or more logic components are associated with each instruction scheduler (440, 450, 460 and 470) to execute the instruction once all source operands of the instruction are available. In one embodiment, logic components of the cluster 430 may include register files (RF) (Integer Register File 444, and Floating Point Register File 480) responsible for storing the values computed by operations. In addition, functional units (FU) (442, 452, 472) may be provided to execute integer, floating point, load/store and copy uOPs.

In one embodiment, memory instruction scheduler 450 interacts with functional unit 452, register files (RF) (444, 480), as well as data cache (DL0) 454 and data table (DTLB) 456 in order to execute load uOPs, as well as store uOPs. Likewise, floating point scheduler 470 interacts with functional unit 472 for executing floating point instructions. In addition, register file 480 is provided to include, for example, single instruction multiple data (SIMD) extensions to (SSE2) registers while FP RF 474 may include SIMD extension type data operands. Finally, integer scheduler interacts with functional unit 442 for executing integer instructions and integer register file 444.

In the embodiment illustrated, each data cache can hold any memory line (i.e., the memory address space is not partitioned). Loads can be steered to any cluster, and in the case of a miss, L2 250 (FIG. 3) is accessed and the line is brought to the cluster. Finally, copy scheduler 450 provides communication to enable exchange of register values among clusters 430. In one embodiment, dynamic estimation of energy consumed by a particular processor block, such as, for example, within each cluster block, is performed by using logic 550, which is illustrated with reference to FIG. 6.

As illustrated with reference to FIG. 6, each functional block includes an activity counter (AC) 560, which is usually present for performance monitoring. A second component of logic 550 is a constant value that is set up at design time and represents the energy consumed per access of the particular block. In one embodiment, the constant value is stored within energy per access register (EAR) 570. AC 560 is updated every cycle according to the number of accesses to the particular block. In one embodiment, the total energy consumed by a block is computed by multiplying AC 560 by EAR 570 for a respective interval and storing the result in the consumption energy register (CER) 590.

Figure 7:
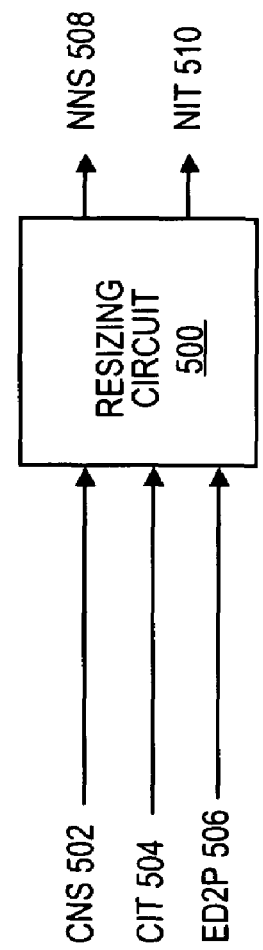
FIG. 7 is a block diagram illustrating a resizing circuit for increasing/decreasing a number of active instruction schedulers within a clustered micro-architecture, in accordance with one embodiment.

As illustrated with reference to FIG. 7, a current architecture configuration will include a current number of active instruction schedulers (CNS) 502. Likewise, the resizing circuit 500 may receive a current interval type (CIT) 504, as well as a current Energy Delay$^2$ Product value (ED$^2$P) 506. In one embodiment, the ED$^2$P value is formed by, or as a product of, a value contained within CER register 590 of all components associated to each particular scheduler and multiplied by a square of the CIT 504.

Accordingly, in one embodiment, resizing circuit 500 of clustered micro-architecture 200 dynamically adjusts the number of active IS according to an energy effectiveness computed according to a metric, such as ED$^2$P. In one embodiment, each cluster has, for example, four IS: INT, FP, CP and MEM. In alternative embodiments, the number of IS types may vary and include one or more of the indicated IS type as well as other like IS types. In the one embodiment, and as illustrated with reference to FIG. 6, based on the values taken from CER register 590 of logic within each component of cluster 430, resizing circuit 500 directs enable/disable logic 520 (FIG. 5) to increase or decrease the number of active IS of each cluster within micro-architecture 200. Procedural methods for implementing one or more of the above embodiments are now described.

Operation

Figure 8:
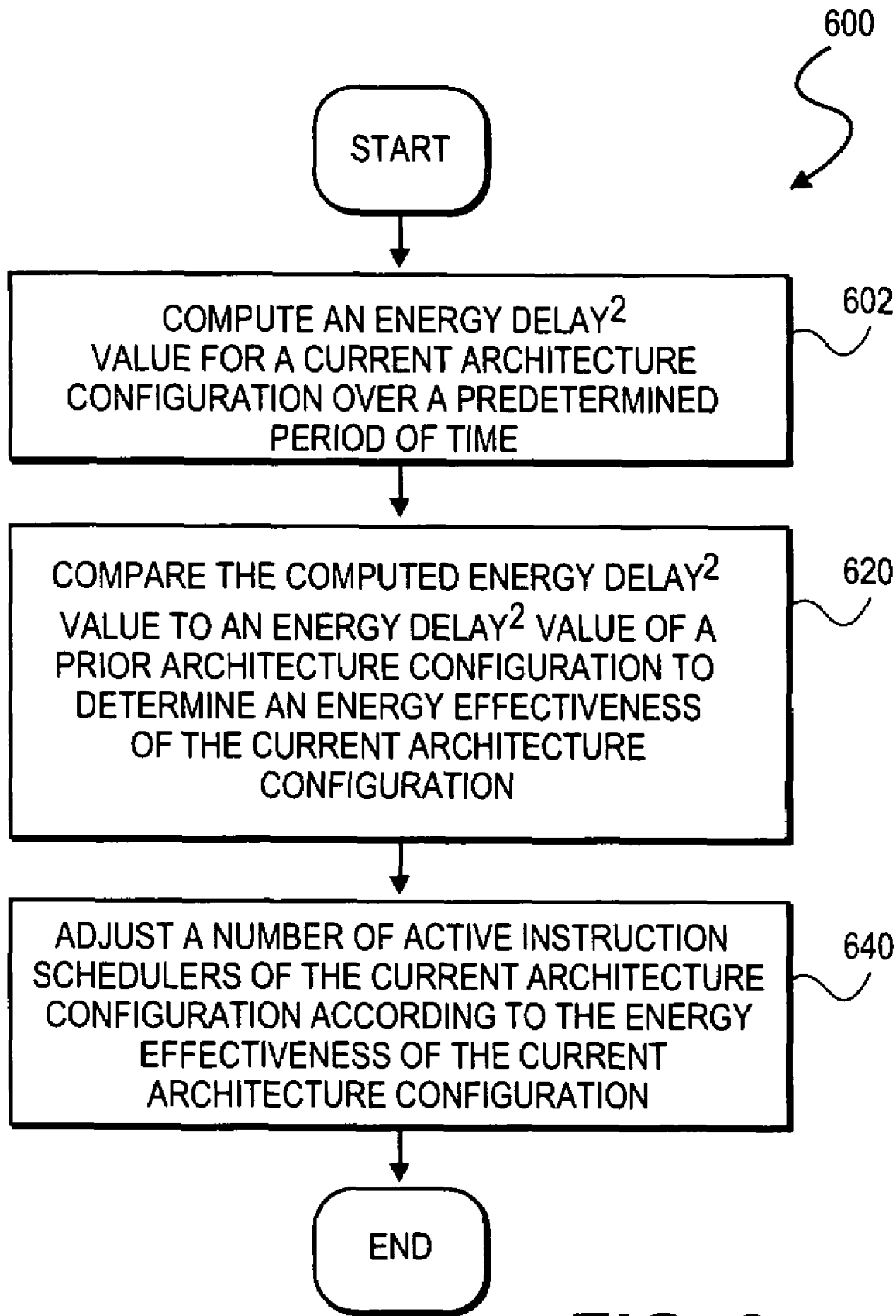
FIG. 8 is a flowchart illustrating a method for implementing an energy-efficient clustered micro-architecture, in accordance with one embodiment.

FIG. 8 is a flowchart illustrating a method 600 for implementing an energy-efficient clustered micro-architecture, for example, as shown in FIGS. 3-7, in accordance with one embodiment. For example, as illustrated with reference to FIG. 3, OOO core 400 may be configured as a four-cluster architecture. As illustrated, each cluster includes a floating point 470, integer 440, a memory 450 and copy 460 instruction schedulers. As a result, when each instruction scheduler of each cluster 430 is active, steering unit 420 may select between four distinct instruction schedulers for each instruction scheduler type. However, depending on the intricacies of a currently running program, having each instruction scheduler active without effectively using each active instruction scheduler may needlessly dissipate power.

Accordingly, in one embodiment, at process block 602, an energy delay$^2$ value for a current architecture configuration is computed over a predetermined period of time, such as, for example, 256 kilo (K) cycles. In one embodiment, the computed energy consumption value is performed using logic 550, as depicted with reference to FIGS. 5 and 6. As illustrated, consumed energy register or CER 590 includes a product of an activity counter 560 and an EAR register 570.

At process block 620, the computed energy delay$^2$ value is compared to an energy delay$^2$ value of a prior architecture configuration to determine an energy effectiveness of the current architecture configuration. In one embodiment, this is performed using resizing circuit 500, as depicted with reference to FIGS. 4 and 7. At process block 640, a number of active instruction schedulers of the current architecture configuration is adjusted according to the energy effectiveness of the current architecture configuration. For example, as depicted with reference to FIG. 7, resizing circuit 500 will generate a number of instruction schedulers (NIS) 508, which may either decrease or increase the number of active instruction schedulers for the architecture configuration.

Figure 9:
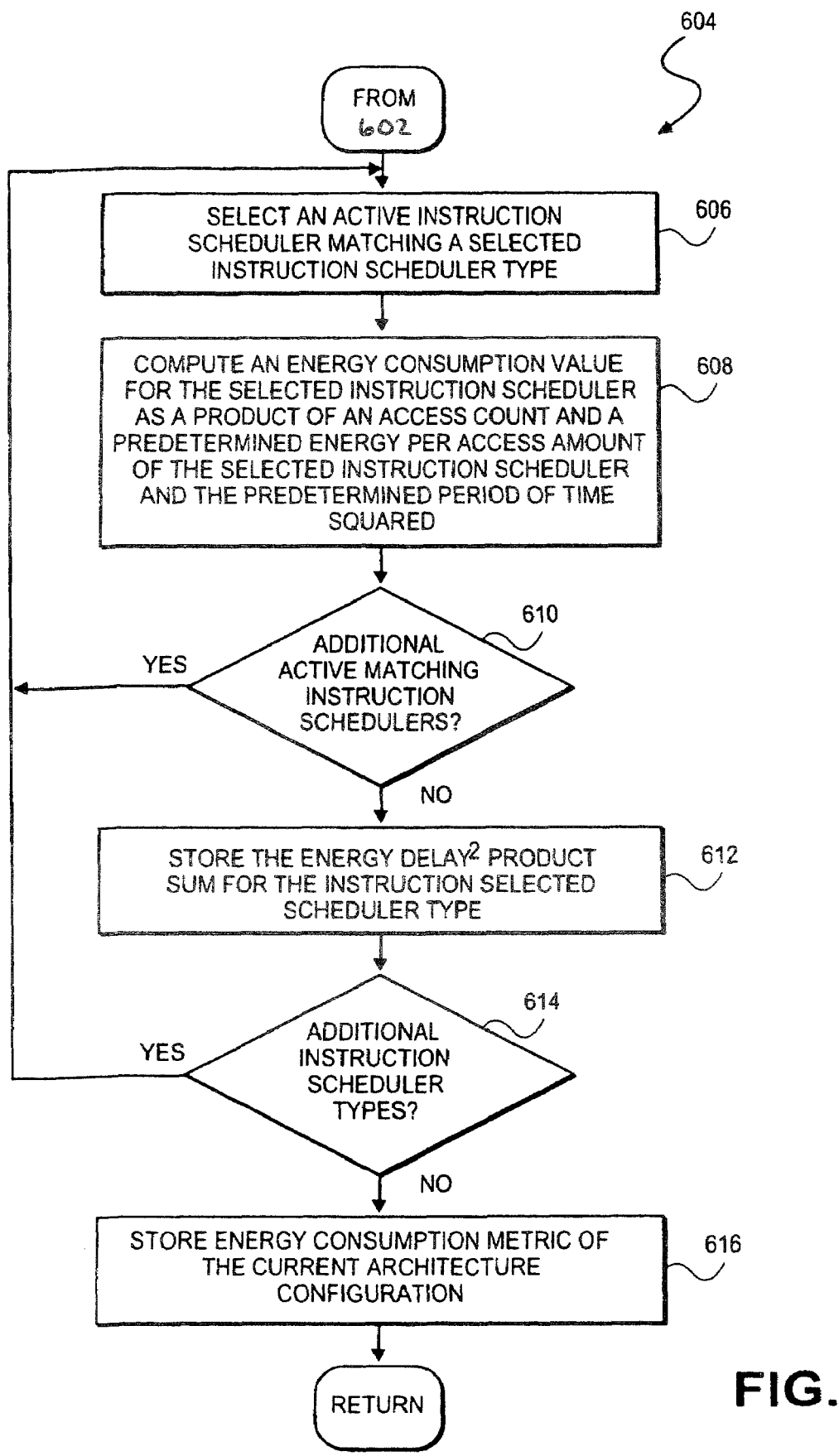
FIG. 9 is a flowchart illustrating a method for computing an energy-consumption value to determine an energy effectiveness of the current architecture configuration, in accordance with one embodiment.

FIG. 9 is a flowchart illustrating a method 604 for computing the energy value of process block 602 of FIG. 8, in accordance with one embodiment. At process block 606, an active instruction scheduler matching a selected instruction scheduler type is selected. For example, as illustrated with reference to FIG. 3, in one embodiment, resizing circuit may initially select an FP instruction scheduler type. Once selected, active instruction schedulers of each cluster matching the instruction scheduler type are queried. At process block 608, an energy consumption value for the selected instruction scheduler is computed as a product of an access count and a predetermined energy access amount of the selected instruction scheduler.

For example, as illustrated with reference to FIGS. 5 and 6, each logic component of, for example, Fscheduler1 470 is queried. Specifically, a CER register 590 of each component of the floating point instruction scheduler is queried to determine an energy consumption value. Once determined, in one embodiment, for example, the resizing circuit squares the predetermined period of time and multiplies the squared predetermined period of time by the computed energy consumption value to form an ED$^2$P product.

In an alternate embodiment, the ED$^2$P product is calculated by logic 550 and stored in CER 590. At process block 610, process blocks 606 and 608 are repeated for each additional active and matching instruction scheduler. Accordingly, an energy delay$^2$ product or ED$^2$P product for each floating point instruction scheduler is computed to form a consumed energy product sum for the selected instruction scheduler type at process block 612. Once formed, at process block 614, process blocks 606 through 612 are repeated for each additional instruction scheduler type.

Finally, at process block 612, an energy consumption metric of the current architecture configuration is stored for each instruction scheduler type. As such, in the embodiment described, an energy consumption product is computed for each instruction scheduler type, such as, for example, for floating point instructions. In one embodiment, an energy consumption value consumed by each floating point instruction scheduler is calculated and summed to compute an ED$^2$P value product for floating point instruction schedulers. In one embodiment, this process is repeated for integer instruction schedulers, memory instruction schedulers and copy instruction schedulers.

Figure 10:
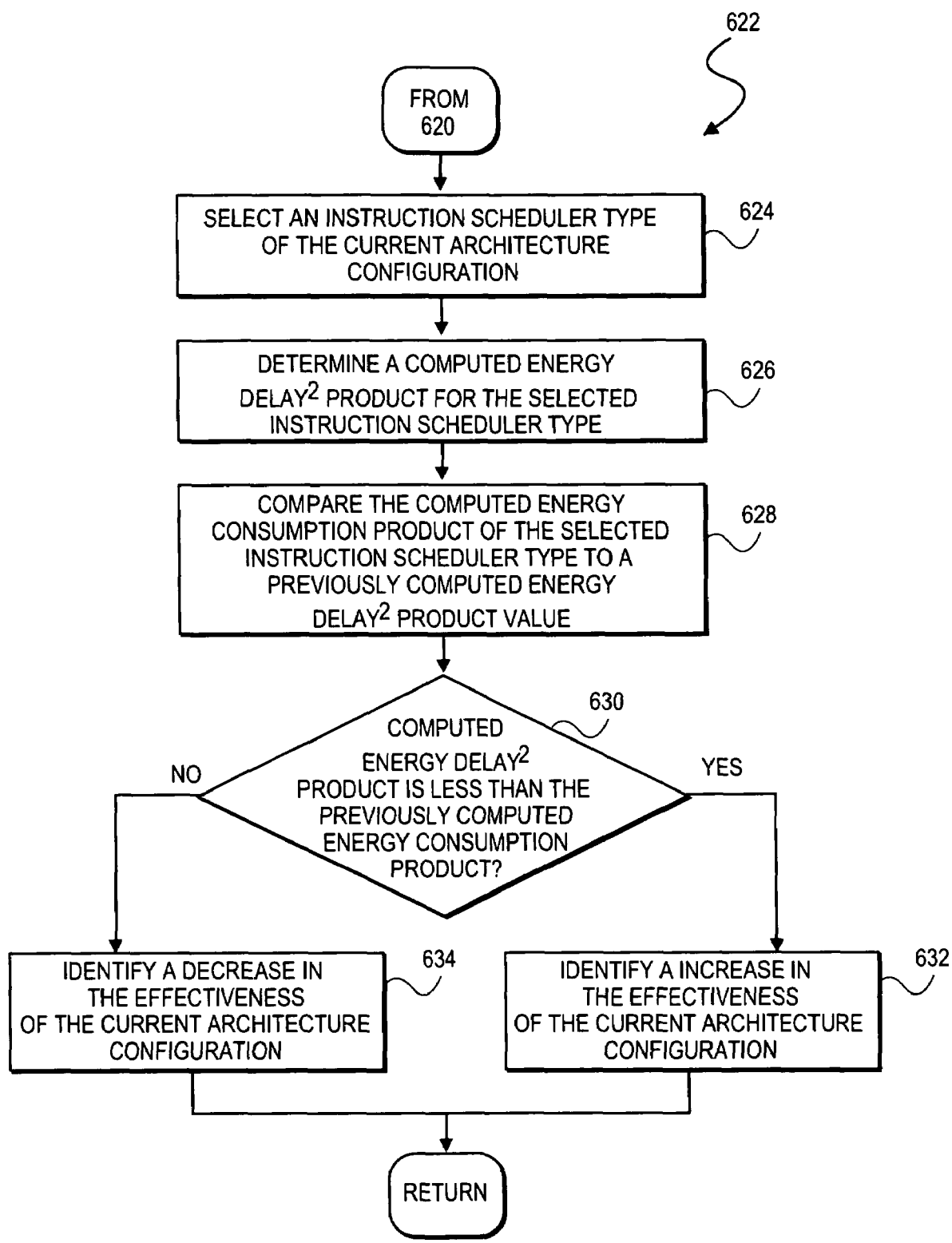
FIG. 10 is a flowchart illustrating a method for comparing an energy delay$^2$ product value to identify a decrease or increase in the energy effectiveness of the current architecture configuration, in accordance with one embodiment.

FIG. 10 is a flowchart illustrating a method 622 for comparing the computed energy consumption value of process block 620 of FIG. 8, in accordance with one embodiment. At process block 624, an instruction scheduler type of the current architecture configuration is selected. Once selected, a computed energy delay$^2$ product for the selected instruction scheduler type is determined. In one embodiment, this is performed by taking a sum of the value contained within CER register 590 for each logic component associated with the selected instruction scheduler type and multiplying the this value by the square of the interval time. At process block 628, the computed energy delay$^2$ product of the selected instruction scheduler is compared to a previously computed energy delay$^2$ product value.

In one embodiment, the current architecture configuration will generally have either an increased number or decreased number of active instruction schedulers. At process block 630, it is determined whether the computed energy delay$^2$ product is less than the previously-computed energy delay$^2$ product. When such is the case, at process block 632, a decrease in the effectiveness of the current architecture configuration is identified. Otherwise, at process block 634, an increase in the effectiveness of the current architecture configuration is identified.

Figure 11:
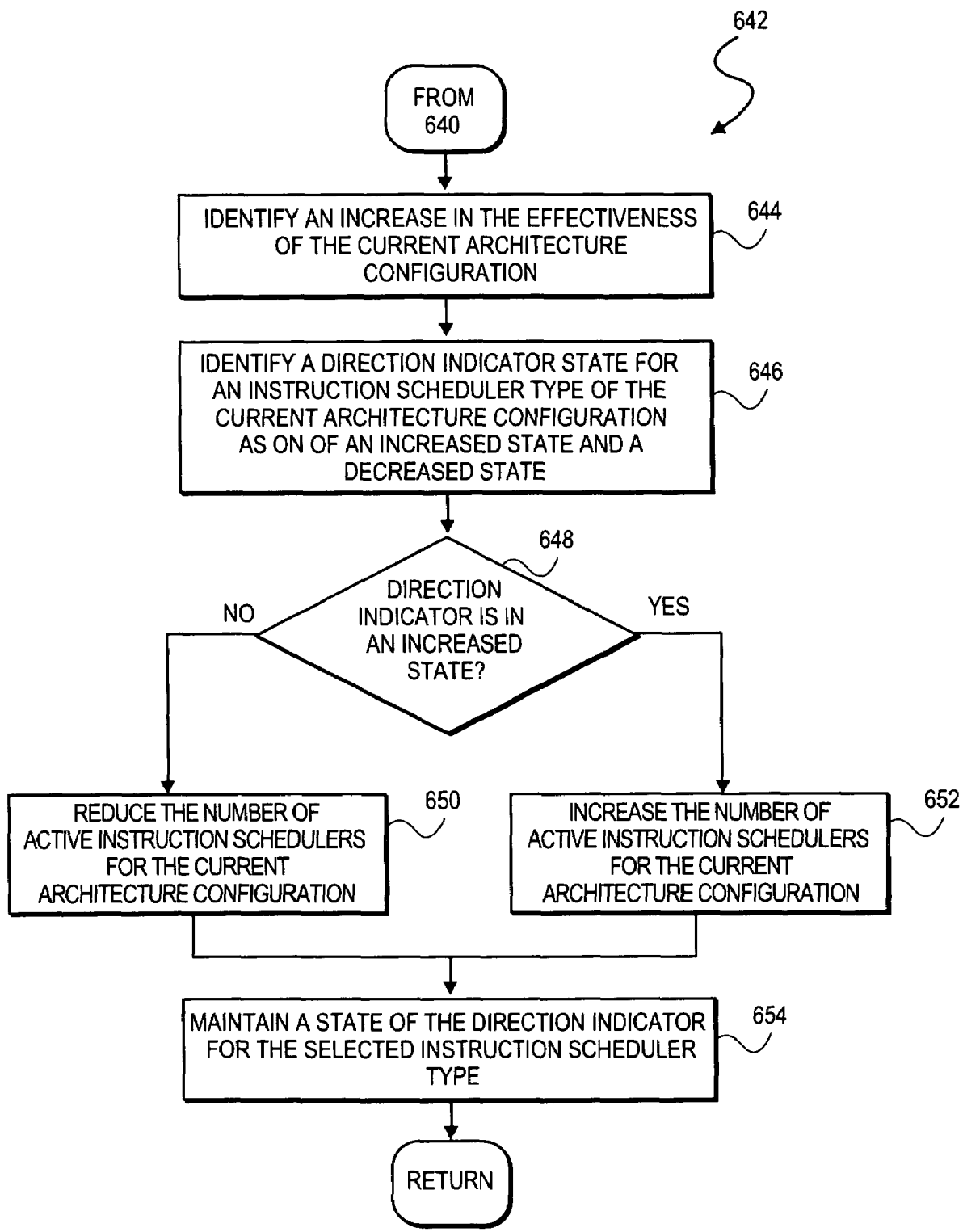
FIG. 11 is a flowchart illustrating a method for adjusting a number of active instruction schedulers of an architecture configuration, in accordance with one embodiment.

FIG. 11 is a flowchart illustrating a method 642 for adjusting the number of active instruction schedulers of process block 640 of FIG. 8, in accordance with one embodiment. At process block 644, an increase in the effectiveness of the current architecture configuration is identified. Once identified, at process block 646, a direction indicator state for an instruction scheduler type of the current architecture configuration is identified as either one of an increased state or a decreased state. In other words, the current architecture configuration will either have increased or decreased the number of active instruction schedulers.

At process block 648, it is determined whether the direction indicator is in increased state. When such is the case, at process block 650, the number of active instruction schedulers for the current architecture information is reduced. Otherwise, at process block 652, a number of active instruction schedulers for the current architecture configuration is increased. At process block 654, the direction indicator state is maintained since an increase in the energy effectiveness of the configuration was achieved.

Figure 6:
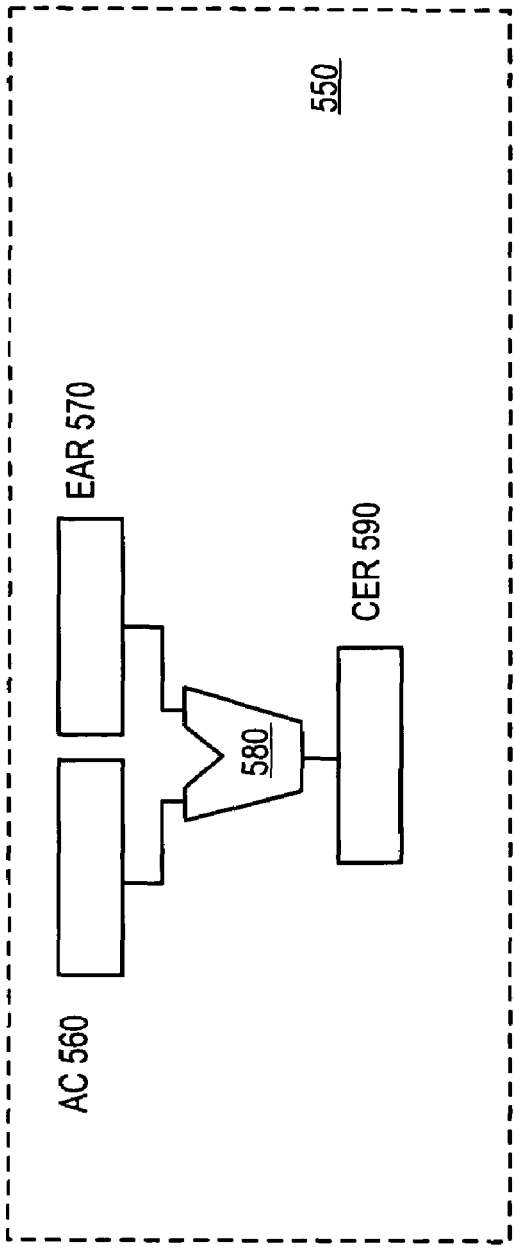
FIG. 6 is a block diagram illustrating consumed energy logic, in accordance with one embodiment.
Figure 12:
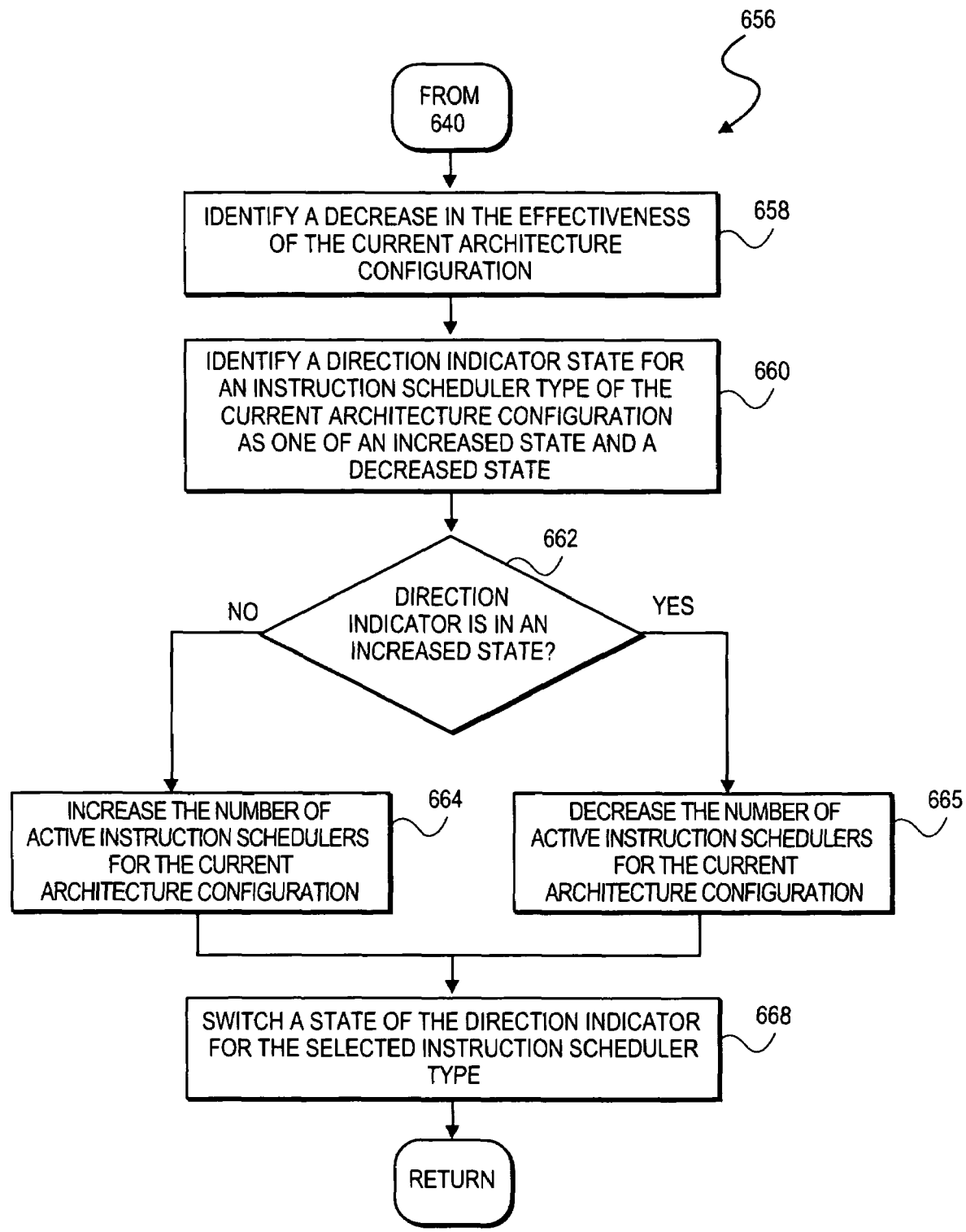
FIG. 12 is a flowchart illustrating a method for adjusting a number of active instruction schedulers of the current architecture configuration, in accordance with a further embodiment.

FIG. 12 is a block diagram illustrating a method 656 for adjusting a number of active instruction schedulers of process block 640 of FIG. 6, in accordance with one embodiment. At process block 658, a decrease in the effectiveness of the current architecture configuration is identified. In other words, in one embodiment, a decrease is identified when an ED$^2$P for the current architecture configuration is greater than any ED$^2$P product for a prior configuration. In other words, when a decrease in the effectiveness of the current architecture configuration is identified, a choice to either reduce or increase (direction indicator state) the number of active instruction schedulers from the prior configuration was incorrect.

Accordingly, at process block 660, a direction indicator for state for an instruction scheduler type of the current architecture configuration is identified as one of an increased state and a decreased state. Once identified, at process block 662, it is determined whether the direction indicator is in an increased state. When such is the case, at process block 664, the number of active instruction schedulers for the current architecture configuration is reduced. Conversely, at process block 665, the number of active instruction schedulers is increased.

At process block 668, a state of the direction indicator for the selected instruction scheduler type is switched in order to achieve an improved energy effectiveness for the new architecture configuration. In one embodiment, increasing of the number of active instruction schedulers is performed by selecting a disabled instruction scheduler matching an instruction scheduler type of the current architecture configuration. Once selected, a clock input to all elements associated with the scheduler is enabled to re-enable the instruction schedulers. Conversely, when a reduction of the number of active instruction schedulers is desired, a clock input to a selected instruction scheduler and its associated elements are disabled.

Figure 13:
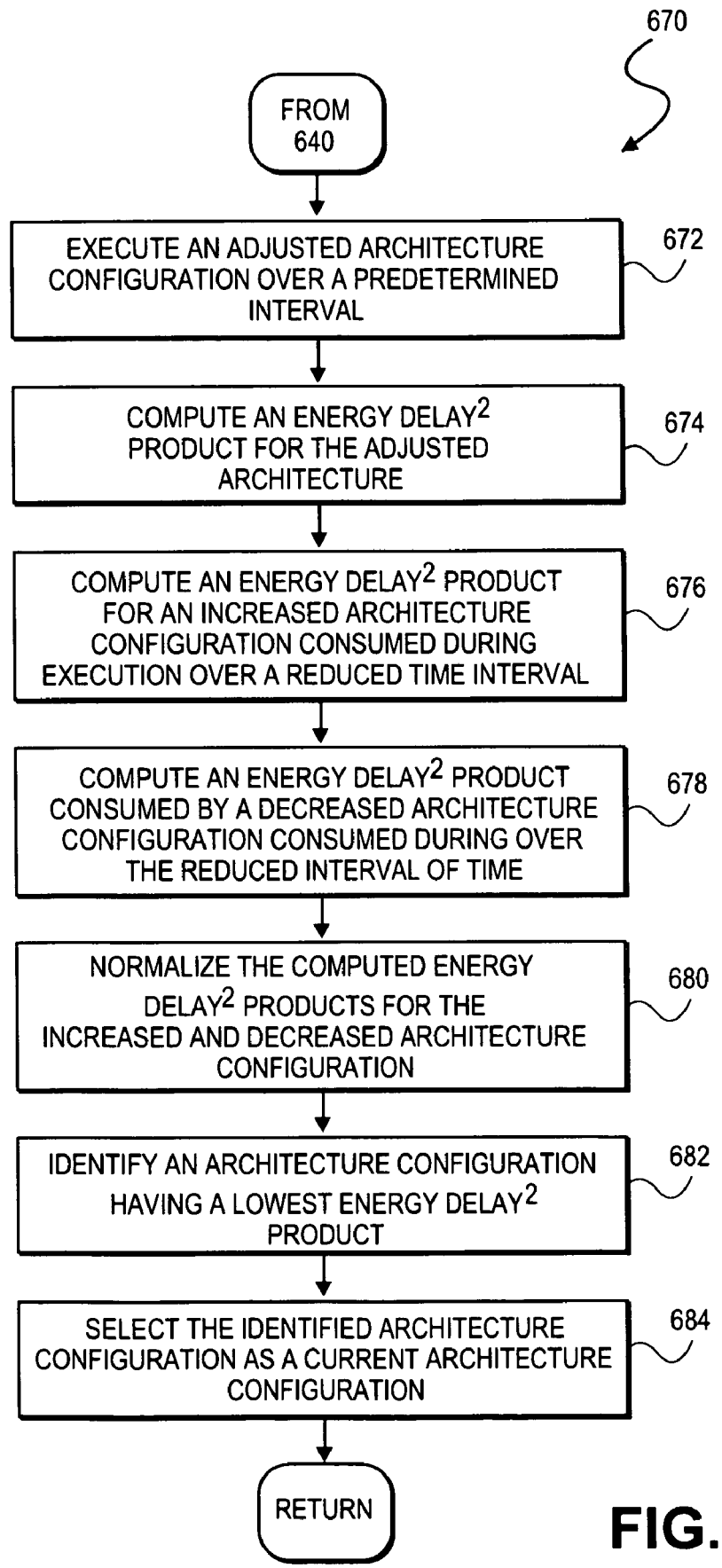
FIG. 13 is a flowchart illustrating a method for enabling or disabling a number of active instruction schedulers of the current architecture configuration, in accordance with one embodiment.

FIG. 13 is a flowchart illustrating a method 670 for enabling or disabling a number of active instruction schedulers for a current architecture configuration, in accordance with one embodiment. At process block 672, an adjusted architecture configuration is executed over a predetermined interval of time. At process block 674, an energy delay$^2$ product is computed for the adjusted architecture configuration consumed during execution over the predetermined interval. At process block 676, an energy delay$^2$ product for an increased architecture configuration is computed based on energy consumed during execution over a reduced time interval. At process block 678, an energy delay$^2$ product consumed by a decreased architecture configuration is computed based on energy consumed over the reduced interval of time.

In other words, in one embodiment, an adjusted architecture configuration may include, for example, N active instruction schedulers, which is referred to as the adjusted architecture configuration. An energy delay$^2$ product for the adjusted architecture configuration is computed while the adjusted architecture configuration executes over the predetermined interval, which may be, for example, 256 K cycles. Next, the increased architecture configuration, which includes N+1 active instruction schedulers, is executed over a reduced time interval, such as, for example, 16 K cycles and an energy delay$^2$ product is determined for the interval. This is repeated for the decreased architecture configuration, which may include N−1 active instruction schedulers.

At process block 680, the computed energy delay$^2$ products for the increased and decreased architecture configurations are normalized to the energy delay$^2$ product for the adjusted architecture configuration to account for the predetermined interval of time, which is greater than the reduced time intervals. At process block 682, an architecture configuration having a lowest energy delay$^2$ product is identified. Once identified, at process block 684, the selected identified architecture configuration is selected as a current architecture configuration.

In other words, a base architecture configuration will include N active instruction schedulers and be allowed to run over a predetermined or large interval (LI). This configuration is then increased to N+1 active instruction schedulers and executed over a small interval (SI) for which an ED$^2$P product is calculated. Next, an architecture and configuration having N−1 active instruction schedulers is also executed over the SI interval for which an ED$^2$P product is also calculated. Finally, the energy delay$^2$ products are compared to identify the configuration having the lowest energy delay$^2$ value, which is clearly the configuration which is most energy effective.

Figure 14:
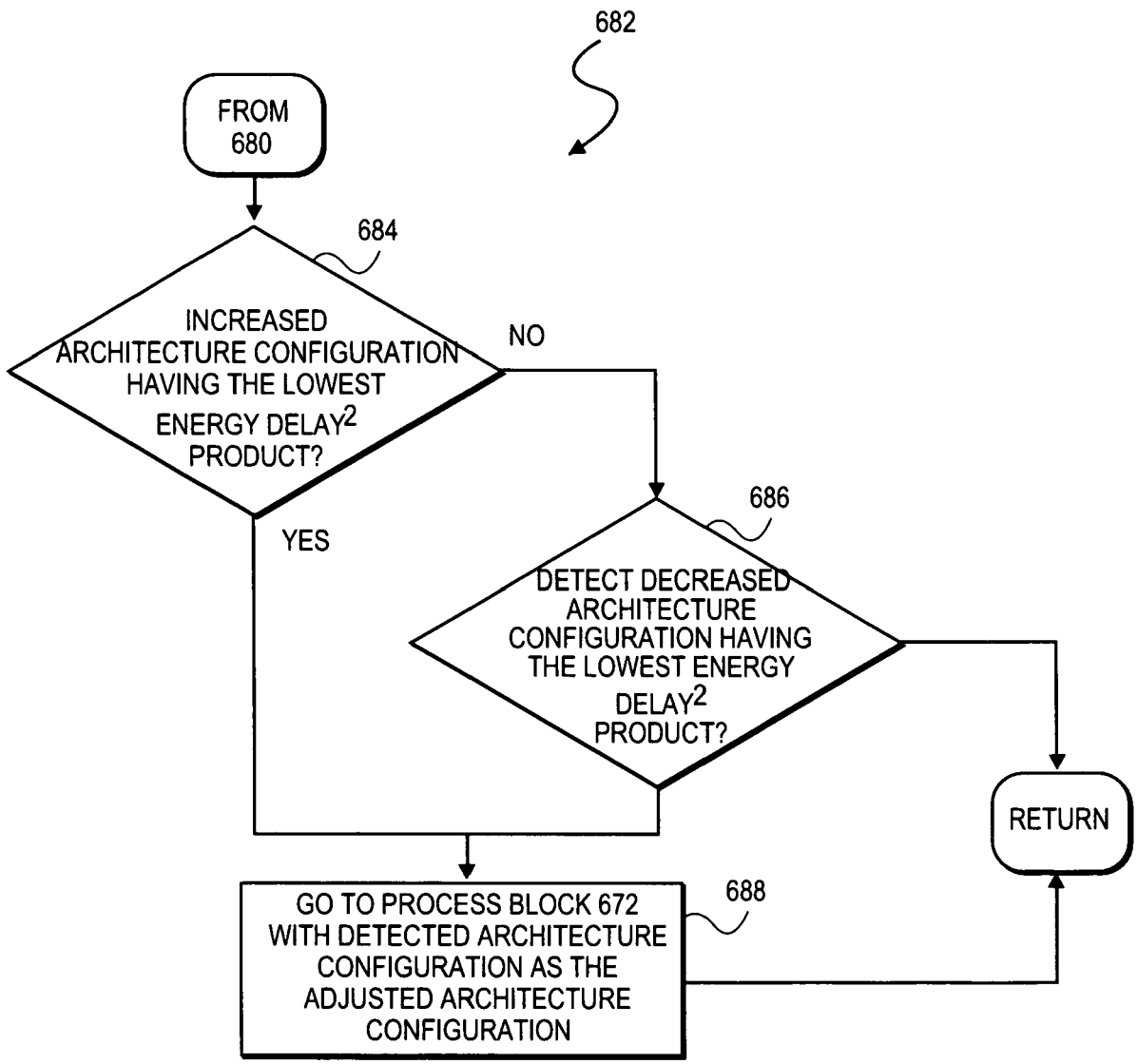
FIG. 14 is a flowchart illustrating a method for further adjusting a number of active instruction schedulers in a current architecture configuration, in accordance with one embodiment.

FIG. 14 is a flowchart illustrating a method 682 further supplementing method 670 of FIG. 13 in accordance with the further embodiment. At process block 686, it is determined whether the increased architecture configuration is detected as having the lowest energy delay$^2$ product. When such is the case, method 670 of FIG. 13 is repeated with the increased architecture configuration as the adjusted architecture configuration. Otherwise, at process block 686, it is determined whether the decreased architecture configuration is identified as having the lowest energy delay$^2$ product. When such is the case, the method of 670 of FIG. 13 is repeated with the decreased architecture configuration as the adjusted architecture configuration.

In one embodiment, if the increased architecture configuration provides the lowest ED$^2$P value, a processor may run during consecutive SI and increase the number of schedulers by one until the maximum number of schedulers is reached or the last configuration does not decrease the ED$^2$P metric. The processor then runs for the LI with the configuration that provides the best ED$^2$P product. Conversely, if the decreased architecture configuration provides a lower ED$^2$P product, the processor runs during consecutive SI and decreases the number of schedulers by one until a minimum number of schedulers is reached or the last configuration executed does not decrease the ED$^2$P metric. From this embodiment, the processor runs for an LI with the configuration that provides the best ED$^2$P metric.

Power dissipation is one of the major hurdles for the design of future microprocessors and all segments from high end servers to mobile computers and program digital assistance. Power dissipation requires resolution from the earliest stages of processor design. Conversely, different sections of code and different sections of applications may have varying characteristics. Accordingly, in one embodiment, the mechanism described for adjusting the number of active instruction schedulers is able to dynamically reconfigure the micro-architecture configuration to optimize power and performance. In one embodiment, an optimization metric is used by calculating the Energy Delay$^2$ Product metric. However, in alternate embodiments, the energy delay$^2$ metric can be generalized for other power efficiency metrics, for example, by simply calculating an energy delay product for, for example, mobile devices.

Figure 15:
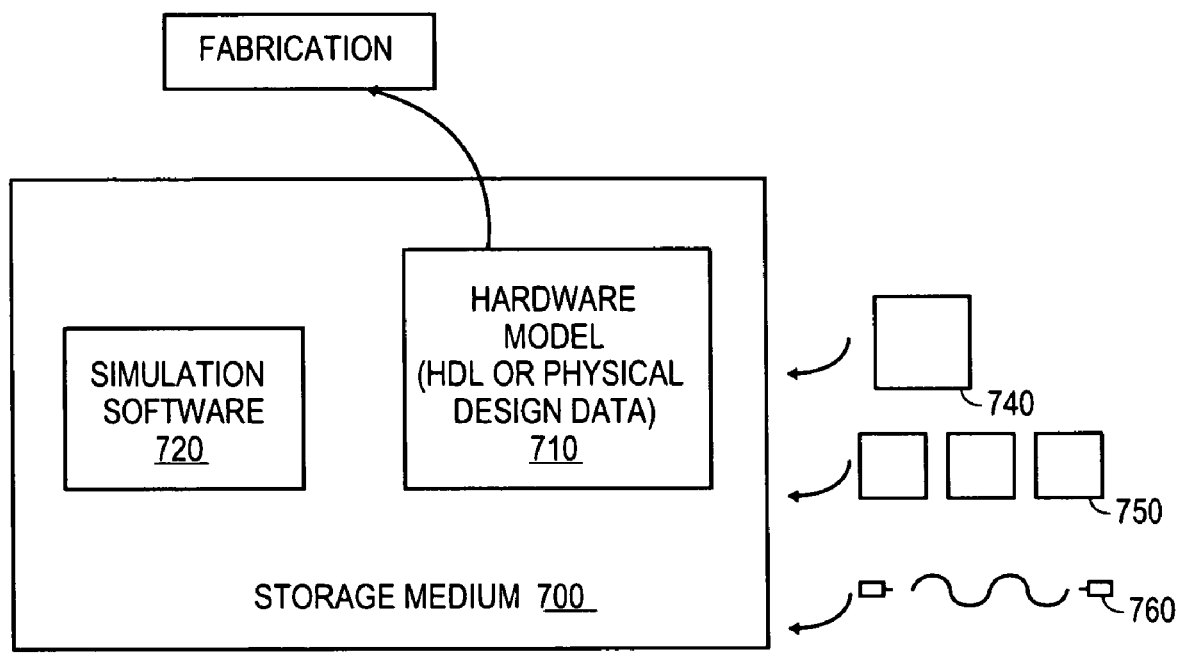
FIG. 15 is a block diagram illustrating various design representations or formats for simulation, emulation and fabrication of a design using the disclosed techniques.

FIG. 15 is a block diagram illustrating various representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 710 may be stored in a storage medium 700, such as a computer memory, so that the model may be simulated using simulation software 720 that applies a particular test suite 730 to the hardware model to determine if it indeed functions as intended. In some embodiments, the simulation software is not recorded, captured or contained in the medium.

In any representation of the design, the data may be stored in any form of a machine readable medium. An optical or electrical wave 760 modulated or otherwise generated to transport such information, a memory 750 or a magnetic or optical storage 740, such as a disk, may be the machine readable medium. Any of these mediums may carry the design information. The term "carry" (e.g., a machine readable medium carrying information) thus covers information stored on a storage device. The set of bits describing the design or a particular of the design are (when embodied in a machine readable medium, such as a storage medium) an article that may be sealed in and out of itself, or used by others for further design or fabrication.

ALTERNATE EMBODIMENTS

It will be appreciated that, for other embodiments, a different system configuration may be used. For example, while the system 100 includes a single CPU 110, for other embodiments, a multiprocessor system (where one or more processors may be similar in configuration and operation to the CPU 110 described above) may benefit from the energy efficient cluster micro-architecture of various embodiments. Further different type of system or different type of computer system such as, for example, a server, a workstation, a desktop computer system, a gaming system, an embedded computer system, a blade server, etc., may be used for other embodiments.

Having disclosed exemplary embodiments and the best mode, modifications and variations may be made to the disclosed embodiments while remaining within the scope of the embodiments as defined by the following claims.

What is claimed is:

1. A processor comprising:
a plurality of instruction schedulers to be selectively activated based, at least in part, on energy efficiency associated with the plurality of instruction schedulers;
logic to determine the energy efficiency by computing an energy performance metric for each of the plurality of instruction schedulers as a product of an access count and an energy amount used per access over a period of time, the energy performance metric including an energy delay$^2$ product metric; and
resizing circuit to
compare the computed energy performance metric with a previously computed energy performance metric associated with each of the plurality of instruction schedulers to determined one or more of the plurality of instruction schedulers that are to be activated, and
activate the one or more of the plurality of instruction schedulers based on the comparison, wherein the comparison comprises
identifying a decrease in energy efficiency if the computed energy performance metric is less than the previously computed energy performance metric, and
identifying an increase in energy efficiency if the computed energy performance metric is greater than the previously computed energy performance metric.

2. The processor of claim 1, wherein the resizing circuit is further to deactivate the one or more of the plurality of instruction schedulers based on the comparison.

3. A computer system comprising:
a memory controller coupled to a memory; and
a processor coupled to the memory controller, the processor having
a plurality of instruction schedulers to be selectively activated based, at least in part, on energy efficiency associated with the plurality of instruction schedulers,
logic to determine the energy efficiency by computing an energy performance metric for each of the plurality of instruction schedulers as a product of an access count and an energy amount used per access over a period of time, the energy performance metric including an energy delay$^2$ product metric, and
resizing circuit to
compare the computed energy performance metric with a previously computed energy performance metric associated with each of the plurality of instruction schedulers to determine one or more of the plurality of instruction schedulers that are to be activated, and
activate the one or more of the plurality of instruction schedulers, base on the comparison, wherein the comparison comprises
identifying a decrease in energy efficiency if the computed energy performance metric is less than the previously computed energy performance metric, and
identifying an increase in energy efficiency if the computed energy performance metric is greater than the previously computed energy performance metric.

4. The computer system of claim 3, wherein the resizing circuit is further to deactivate the one or more of the plurality of instruction schedulers based on the comparison.

* * * * *